Oct. 9, 1956     E. M. TUCKER, JR     2,765,862
CHAIN AND WORM GEAR DRIVE TRACTOR
Filed Aug. 30, 1954     2 Sheets-Sheet 1
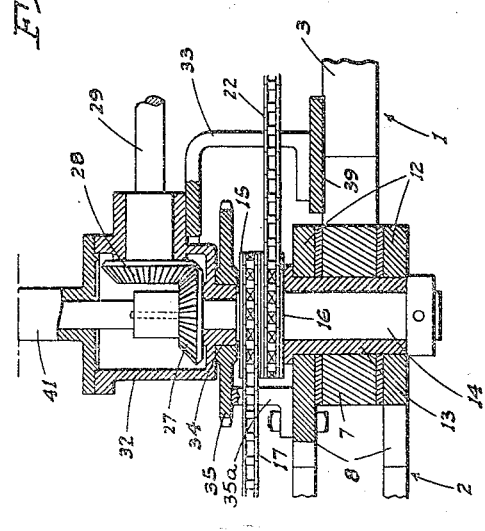
INVENTOR
*Emmitt M. Tucker Jr.*
BY
ATTORNEYS

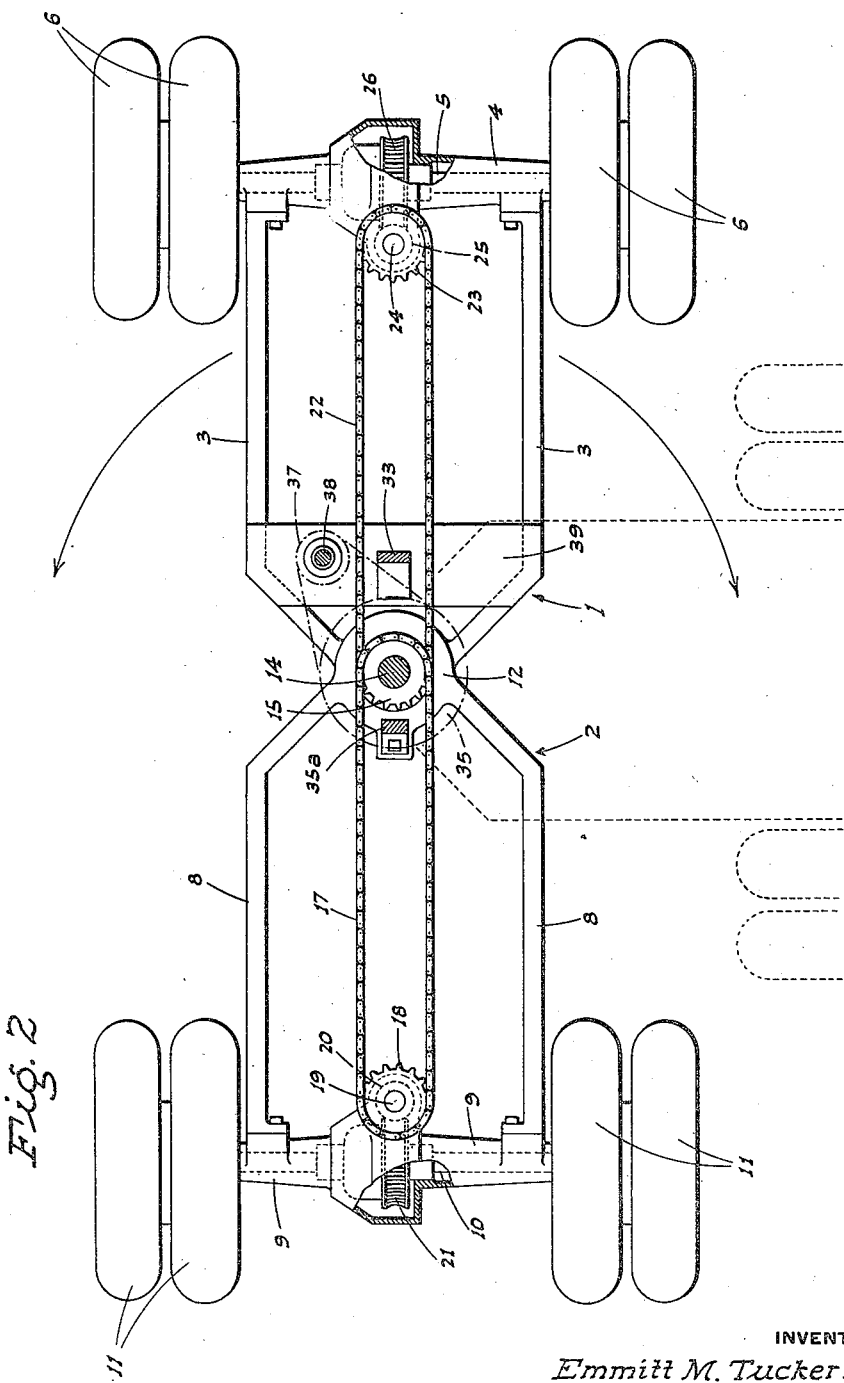

United States Patent Office 2,765,862
Patented Oct. 9, 1956

2,765,862

CHAIN AND WORM GEAR DRIVE TRACTOR

Emmitt M. Tucker, Jr., Medford, Oreg., assignor to Tucker & Sons, Grass Valley, Calif., a corporation of California Application August 30, 1954, Serial No. 453,006

3 Claims. (Cl. 180—51)

This invention relates to short-turn wheeled tractors, and the major object is to provide a tractor which includes front and rear chassis sections, turnable relative to each other through a large arc about a vertical axis, and novel chain drive units extending from said axis to the wheels of both sections. The chain drive units are disposed so that no universal joint drive connections are needed, the use of gearing is minimized, and said units are arranged above the frames of the chassis sections so that the tractor has high clearance, and the chains are clear of possible damaging contact with obstructions projecting upwardly from the terrain over which the tractor may be passing.

A further object of the invention is to provide a simple and practical means for steering the tractor by turning the chassis sections relative to each other about the vertical pin or axis of the sections.

It is also an object of the invention to provide a chain drive mechanism for the purpose described which is rugged in structure; designed for ease and economy of manufacture; and one which will be exceedingly effective for the purpose for which it is designed.

Still another object of the invention is to provide a practical, reliable, and durable chain and worm gear drive tractor, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved tractor, partly broken away and in section.

Fig. 2 is a top plan view of the chassis sections of the tractor, with the engine and other accessories removed or omitted to show the particular chain drive arrangement.

Fig. 3 is a fragmentary enlarged sectional elevation taken through the common vertical chain drive shaft and pivotal axis connection for the chassis sections, and showing the connection between said shaft and the engine shaft, and the mounting of the steering-control sprocket relative to said vertical shaft.

Referring now more particularly to the drawings, and to the characters of reference marked thereon, the tractor essentially comprises front and rear chassis sections 1 and 2. The front section includes side frame beams 3 secured at their forward end on the housing 4 of the front axle unit 5 of the front wheels 6. At their rear end, beams 3 converge to and support a fifth wheel plate 7.

The rear chassis section includes vertically spaced pairs of side beams 8 secured at their rear end on the housing 9 of the rear axle unit 10 of the rear wheels 11. At their forward end the beams 8 converge to and support fifth wheel plates 12 which straddle and relatively turn on plate 7.

A heavy mounting bushing 13 (see Fig. 3) projects through the plates 7 and 12 and connects them in relatively turnable relation, and a shaft 14 is turnably mounted in, and projects some distance above, said plates.

Fixed on the shaft 14 directly above the fifth wheel unit, and in close association with each other, are upper and lower, equal sized sprockets 15 and 16, respectively. An endless chain 17 connects sprocket 15, and a similar sprocket 18 mounted on the upper end of the upstanding shaft 19 of a worm 20 journaled in the housing 9; said worm cooperating with a worm wheel 21 which forms part of the conventional differential unit included with the axle unit 10.

An endless chain 22 connects the lower sprocket 16 with a similar sprocket 23 mounted on the upper end of the upstanding shaft 24 of a worm 25 journaled in housing 4; this worm driving a worm wheel 26 which forms part of the conventional differential unit included with the axle unit 5. The worm shafts 19 and 24 are of course parallel to the central shaft 14.

The shaft 14 extends and upstands some distance above the sprockets 15 and 16, and supports on such upstanding portion a bevel gear 27 meshing with another bevel gear 28 which is connected to a drive shaft 29 projecting rearwardly from a transmission box 30. This box as usual is disposed to the rear of, and is operatively connected to, the drive shaft of an internal combustion engine 31 of standard type, and which is supported from the frame beams 3 in any suitable manner, and so that it is clear of the forward chain 22.

The gears 27 and 28 are mounted in a gear box 32 held in stationary relation with the front frame 3 by a suitable bracket 33. The box 32 includes a depending hub 34 which engages shaft 14 between gear 27 and the upper sprocket 15.

Turnable on the hub 34 is a relatively large sprocket wheel 35, and a sprocket pinion 36 is disposed on a level therewith a short distance ahead of the same; an endless chain 37 extending about the sprockets. The sprocket 35 is held rigid with the rear section 2 by a bracket 35a, while pinion 36 is fixed on an upstanding steering post 38 turnably mounted on a platform 39 spanning and supported on the beams 3; a steering wheel 40 being fixed on the upper end of the post 38.

Upon rotation of the post, therefore, the two chassis sections may be rotated relative to each other about the shaft 14 as an axis, and without interfering with the driving of the chains to both pairs of wheels simultaneously. The chassis and wheel arrangement is such that the two sections may be turned through a full 180° arc relative to each other if desired; a 90° turn to one side being indicated in dotted lines in Fig. 2.

The gear box 32 includes an upstanding circular boss 41 onto which a collar 42 is adjustably clamped. A seat 43 is disposed rearwardly of the gear box, and includes a forwardly projecting base 44 supported for horizontal swivel movement by ears 45 projecting from the collar 42. By reason of this arrangement the seat may be set, either vertically or laterally relative to said boss, in the position most convenient to the occupant of the seat for operating the steering wheel.

The various chain drives, being above the frame units, places them well clear of any possibility of damage from exterior sources, and although not so shown, said chain drives are preferably encased in shields or housings, which obviously can easily be done, and which gives the chains protection against dust and the like.

As shown, the tractor wheels 6 and 11 are preferably of the dual tire type, which can be used without interfering with the desired short-turn feature of the tractor.

From the foregoing description it will be readily seen that there has been produced such a device as substantially fulfills the object of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tractor comprising front and rear wheels, front and rear axle units for corresponding wheels, rigid housings in which the axle units are turnably mounted, longitudinal front and rear chassis frames each including transversely spaced side beams rigid with the corresponding housing, means connecting the frames together at adjacent ends for relative rotation about a vertical axis, each housing including a gear box disposed between the corresponding frame beams, a vertical shaft journaled in each box and upstanding to a level above the frames, said shaft being operatively connected to the related axle unit, a sprocket on the upper end of each vertical shaft, the sprockets being at adjacent but different levels, a vertical engine-driven shaft journaled in the frames co-axial with said axis of relative rotation and projecting above said frames, sprockets on the projecting portion of the last named shaft at levels corresponding to those of the first named shafts, and endless chain drives connecting corresponding-level sprockets.

2. A tractor, as in claim 1, with a power plant mounted on one frame and extending lengthwise thereof above and clear of the adjacent drive chain, the power plant including a rearwardly projecting drive shaft disposed radially of said driven shaft, meshing bevel gears connecting the last named shafts above the chain drives, a gear box enclosing said gears and turnably mounted on said driven shaft, and a bracket rigidly connecting the gear box and said one frame.

3. A tractor, as in claim 1, in which the first named vertical shafts are disposed at the back and front of the front and rear gear boxes, respectively, the operative connections between the related axle units being worm gearing, the worms of which are on said vertical shafts.

References Cited in the file of this patent

UNITED STATES PATENTS

| | | |
|---|---|---|
| 652,648 | Sommer | June 26, 1900 |
| 858,658 | Kennedy | July 2, 1907 |
| 1,085,350 | Marker | Jan. 27, 1914 |
| 1,194,085 | Smith | Aug. 8, 1916 |
| 1,285,841 | Tinker | Nov. 26, 1918 |
| 1,373,981 | Smith | Apr. 5, 1921 |

FOREIGN PATENTS

| | | |
|---|---|---|
| 961,583 | France | Nov. 21, 1949 |
| 1929 1905 | Great Britain | Dec. 14, 1905 |
| 478,857 | Great Britain | Jan. 26, 1938 |
| 100,849 | Switzerland | Sept. 1, 1923 |